United States Patent [19]
Vlasov et al.

[11] 3,983,738
[45] Oct. 5, 1976

[54] CRANK PRESS DRIVE

[76] Inventors: Viktor Ivanovich Vlasov, ulitsa Kakhovka, 14, korpus 1, kv. 29, Moscow; Jury Timofeevich Guriev, ulitsa Begovaya, 10, korpus 2, kv. 22, Voronezh; Viktor Vladimirovich Lebedev, Kremenchugskaya, ulitsa, 23, kv. 29, Moscow; Vladimir Andreevich Noskov, ulitsa Koltsovskaya, 41, kv. 55, Voronezh; Vladimir Efimovich Svistunov, ulitsa Simonovsky val, 24, korpus 3, kv. 44, Moscow; Mikhail Vladimirovich Kholmogorov, ulitsa Trofimova, 20, kv. 50, Moscow; Jury Mitrofanovich Artemov, ulitsa Textilschiki vosmaya, 7, kv. 23, Moscow; Petr Nikolaevich Vysotsky, ulitsa Mashinostroitelei, 26a, kv. 8, Voronezh; Viktor Gavrilovich Pljugachev, Onezhskaya ulitsa, 45/19, kv. 186, Moscow; Vladislav Nikolaevich Tynyanov, ulitsa F. Engelsa, 70, kv. 80; Ivan Nikanorovich Filkin, ulitsa Plekhanovskaya, 45, kv. 11, both of Voronezh, all of U.S.S.R.

[22] Filed: Nov. 13, 1974

[21] Appl. No.: 523,440

[52] U.S. Cl. ............................. 72/429; 72/450; 74/572; 100/282; 192/48.91
[51] Int. Cl.² .................................. B21J 9/18
[58] Field of Search ............ 72/429, 450, 435, 445; 100/282; 74/572; 192/48.9, 48.91

[56] References Cited
UNITED STATES PATENTS

| | | | |
|---|---|---|---|
| 2,237,170 | 4/1941 | Williamson | 72/450 |
| 2,535,842 | 12/1950 | Criley | 74/572 |
| 2,667,248 | 1/1954 | Wissman | 100/282 |
| 3,595,163 | 7/1971 | Baum | 100/270 |

FOREIGN PATENTS OR APPLICATIONS

| | | | |
|---|---|---|---|
| 810,460 | 3/1959 | United Kingdom | 100/282 |

Primary Examiner—C.W. Lanham
Assistant Examiner—Gene P. Crosby
Attorney, Agent, or Firm—Lackenbach, Lilling & Siegel

[57] ABSTRACT

The invention is intended for crank presses. The drive according to the invention, comprises a first flywheel installed on a crankshaft connected to a slide block and a second flywheel connected to the crankshaft by means of a clutch. The first flywheel is rotated by means of a motor. Gyratory mass of the flywheel is selected to be such that kinetic energy of the flywheel accumulated by it in the course of its acceleration would be fully spent by it in carrying out the technological operation and in returning the slide block to the initial position. The driving motor may be represented by one or several synchronously operating hydraulic motors or electric motors disposed over a circumference concentric with the flywheel and connected to the latter by means of gear trains of similar gear ratio.

6 Claims, 10 Drawing Figures

CRANK PRESS DRIVE

The present invention relates to forging and pressing machinery and particularly to crank press drives.

The present invention may be most efficiently utilized in powerful crank presses intended for example for such operations as three-dimensional hot stamping, cold extrusion, etc.

In modern crank presses an electric motor is connected through a drive system to a crankshaft which by means of a converting mechanism is connected to a working member — a slide block of the press.

During one full revolution of the crankshaft the slide block performs a working stroke whose extension is determined by the eccentricity of the crankshaft and the type of the converting mechanism. In the course of the working stroke the slide block occupies two fixed positions — upper and lower ones. The process of performing the technological operation, i.e. the actual working stroke, is performed at the end of the first half revolution of the crankshaft.

Duration of the technological operation in crank presses does not exceed tenths of a second and during this time a considerable amount of energy accumulated in the drive is spent out. This energy is consumed in the course of performing the technological operation for plastic deformation of the blank, for elastic deformation of the press components and for friction in the converting mechanism (ref. to E. N. Lanskoy, A. N. Banketov "Elements of Calculation of Crank Press Parts and Units", (Elementy rascheta detaley i uzlov kryvoshipnykh presov), Mashinostroyenie Publishers, 1966).

The crank press drive incorporates a flywheel which after a single revolution of the crankshaft is disconnected from the latter by means of a clutch. In the course of the working stroke the flywheel is retarded to yield a portion of its energy. Upon disconnection of the clutch the flywheel speeds up to accumulate the energy of the electric motor up to a preassigned rated value sufficient for normal operation of the crank press.

The drive layouts of crank presses designed for three-dimensional hot stamping and for sheet-metal stamping differ from each other only in the number of geartrains, location of the clutch and brake, type of the converting mechanism, dimensions of the slide block, etc. Common for all modern crank press drives is that during the working stroke of the slide block the technological operation takes only a portion of the energy not exceeding 10 – 30% of the total kinetic energy accumulated by the flywheel. The remaining surplus portion of the kinetic energy of the flywheel is left within the drive of the machine thus causing the poor reliability of many crank presses.

Modern drives of crank presses use in most cases three-phase induction motors and much more rarely direct current motors as a source of power.

Screw presses use other types of motors, such as hydraulic motors, induction motors, wherein each stator is positioned over an arc of a circumference concentric with the rotor.

However, in screw presses during the working stroke of the slide block the extreme lower position of the slide block is not fixed and the speed of the flywheel and the screw is not limited before the commencement of the technological operation.

Apart from that, upon completion of the technological operation to return the slide block to the initial position it is necessary to reverse the hydraulic motor or electric motor, i.e. to switch them for rotation in the reverse direction.

This is the principle difference in the operation of screw presses as compared with crank presses, which excludes simple borrowing of design solutions developed for screw presses for their utilization in the drive of crank presses.

In crank presses, deceleration of the flywheel connected by the V-belt drive to the shaft of the electric motor is limited by the permissible slipping of the electric motor, i.e. by the reduction of its rotor speed.

Conventional electric induction motors permit slipping of not more than 3 – 5% of the synchronous speed of the stator rotating field, while special-purpose induction motors of increased slipping ability or with phase-wound rotor — not more than 10 – 15%. Under this limited reduction of speed the kinetic energy of the flywheel in the course of the working stroke of the slide block can be reduced only by 10% in the drives with common-make electric motors and by approximately 30% in the drives with increased-slipping electric motors. Consequently, to perform the working stroke of the slide block and to carry out the technological operation a need arises for a large surplus reserve of energy accumulated in the drive of the crank press. This leads to larger dimensions and heavier weights for the flywheel.

Unused surplus kinetic energy of the flywheel (amounting to 70 – 90%) remains within the drive of the crank press and leads to considerable two-threefold overloading of the press in terms of force and torque to cause jamming and breakage of the press, increased wear of sliding surfaces of the converting mechanism, overheating and disabling of the drive electric motor and other grievous results. Moreover, the higher the amount of the surplus kinetic energy the larger is the overloading of the press and the more dangerous is the effect of wedging the press. Maximum overloading takes place during a so called rigid impact when the entire kinetic energy of the flywheel is transferred into the energy of elastic deformation of the press (excluding loss for friction in the elements of the converting mechanism).

Taking the slide block out of the jammed position is difficult (and sometimes even impossible) due to the presence of high forces of friction in the junctions between the elements of the converting mechanism caused by forces several times higher than nominal ones. Methods used at present to take crank presses out of the jammed condition under high overloading of the press come to be ineffective.

Apart from what has been said above, a large reserve of the gyratory mass of the flywheel (under gyratory mass we mean moment of inertia) in the known layouts of crank presses does not allow the displacing speed of the slide block to be increased by the start of its working stroke due to a danger of considerable dynamic loads occurring in the drive of the machine even under normal operating conditions of the press. As a result, for example in hot stamping presses, the period of contact between a heated blank and the tool is increased to cause more wear of the latter.

Dynamic loads occurring in the drive of the press in the course of performing the technological operation impair the durability of the drive elements to result in poor reliability of crank presses. Resulting from the hampering manifestation of these dynamic loads is a limitation of the high extreme of the force developed by hot stamping crank presses.

An object of the present invention is to provide such a drive of a crank press, whose design would make it possible to increase its reliability.

Another object of the present invention is to provide such a drive of a crank press that would permit it to simplify the design of the press drive.

One more object of the present invention is to provide such a drive of a crank press that would permit it to widen the technological ability of the press.

These and other objects are achieved in a crank press drive comprising a motor connected to a flywheel installed on a crankshaft, and a clutch connecting the flywheel to the crankshaft for transmitting torque to it for displacing a slide block of the press, connected to the crankshaft by means of a converting mechanism. According to the invention, the flywheel has such a magnitude of gyrating mass that kinetic energy accumulated in the course of its acceleration is in fact fully spent during a single complete revolution of the crankshaft, including the consumption of energy needed for performing the technological operation while applying to the slide block the maximum load permissible for the given press.

In the proposed crank press drive, reduction of the flywheel gyratory mass as compared with the flywheels of known drives of crank presses of the similar purpose makes it possible to minimize the surplus kinetic energy in the drive.

The mass and dimensions of the flywheel are determined from the condition of accumulating in it the kinetic energy needed for performing a single working stroke of the slide block and for carrying out the technological operation during this stroke.

Upon downward displacement of the slide block and carrying out the technological operation the speed of the flywheel is reduced to such a value that the crankshaft would return to the initial position at the expense of kinetic energy left in the crankshaft itself and in the components rigidly connected to said crankshaft.

Due to this reduction in the flywheel speed the rate of load building-up on the slide block in carrying out the technological operation is reduced, therefore the variation of the force on the slide block versus time is of a more favourable character than in a crank type machine with a known drive carrying out a similar operation.

Reduction of the surplus energy of the flywheel allows the crankshaft speed to be increased and the time spent for carrying out the technological operation to be shortened without a danger of incurring increased dynamic loads or overloading the press in terms of force.

Shortening the time needed for carrying out the technological operation, for example in hot stamping, is very effective, because this is instrumental in improving the durability of the tool due to a reduced period of its contact with the hot blank.

The above mentioned factors are of great importance in developing powerful hot stamping crank presses.

Stepping-up the speed of the crankshaft and the speed of the slide block simplifies the kinematic layout of the drive, assists in applying effective methods of reducing friction loss in the converting mechanism and simultaneously improves the technological ability of crank presses, i.e. makes them suitable for carrying out technological operations requiring a higher speed of the slide block.

The invention according to one version of its embodiment may have an additional flywheel installed on the crankshaft in coaxial relationship with the previously mentioned flywheel, being of larger diameter and higher gyratory mass as compared with the previously mentioned flywheel. For this purpose the drive incorporates a double-position clutch, where in one of its position during idle rotation of the flywheels the clutch couples them together, while in its other position during displacement of the slide block it couples the previously mentioned flywheel with the crankshaft and simultaneously disconnects the flywheels from each other.

This permits using a conventional electric induction motor which at the present time is employed in the drives of crank presses, because during the period of carrying out the technological operation the larger diameter flywheel coupled with the electric motor is disconnected from the smaller diameter flywheel which rotates the crankshaft. Thus, in carrying out the technological operation consumption of kinetic energy accumulated by the flywheel of smaller diameter and less gyratory mass as compared with the other flywheel brings no influence on the functioning of the electric motor.

Application in the crank press drive of a power source in the form of a hydraulic motor connected to the flywheel through a medium of a mechanical transmission, such as gearing, opens way for substantial simplification of the press design by doing away with additional mechanisms between the motor and the crankshaft.

In addition, there is no need for reversing the hydraulic motor upon completion of the technological operation by the slide block, in contrast to screw presses which can't do without it.

Essentially important is also the ability of varying the speed of the hydraulic motor shaft and of the flywheel when rotating idle. The given drive is adapted for presetting the required flywheel speed needed for carrying out a certain technological operation when treating various products by means of the crank press.

The production and installation of a single hydraulic motor of the required power for powerful crank presses involve considerable technical difficulties. In addition, increased power of hydraulic motors entails increasing relative loss of power in them. It is expedient for these machines to install several synchronously operating hydraulic motors disposed over a conventional circumference concentric with the flywheel and connected to the latter through the medium of geartrains of similar gear ratio.

The function of the flywheel may be fulfilled by the rotor of the electric induction motor whose stator is disposed over the arc of a circumference concentric with the flywheel.

In this design of the drive, application of the electric induction motor with the stator disposed over the arc of the rotor circumference helps achieve the required speed of the crankshaft without using any intermediate transmission between the electric motor and the flywheel. With the application of such an electric motor, the reduction of the flywheel speed is accompanied with full disposal of kinetic energy accumulated by the flywheel, while heat-removal from the surface of the electric motor is improved. The simple design of the drive requires less cost to manufacture and besides, there is no need for reversing the motor.

In case the flywheel requires considerable power to be brought to it the power source of the drive may be expediently represented by several synchronously operating electric induction motors disposed over a circumference concentric with the flywheel, and connected to the latter through the medium of gear trains of similar gear ratio, wherein each individual electric motor incorporates a stator disposed over the arc of a circumference concentric with the rotor of the given electric motor. However, in separate cases the power source may be represented by a conventional induction motor with a special control arrangement for limiting its maximum torque.

Other objects and advantages of the invention will be more clearly understood from the following detail description of its actual embodiments and the accompanying drawings, in which.

The proposed press drive (FIG. 1) incorporates an electric induction motor 1 connected through a pulley 2 of a belt drive 2' to a flywheel 3 installed on one end of a crankshaft 4. Installed on the crankshaft 4 in coaxial relationship with the flywheel 3 is a flywheel 5 to be coupled by means of a clutch 6 either with the flywheel 3 or with the crankshaft 4.

In the existing crank press drives the energy consumed in the course of carrying out the technological operation is characterized by the rate of deceleration of the flywheel angular velocity and is determined by the following formula:

$$E_1 = E_0(1 - \epsilon_1^2) \qquad (1)$$

where:

$E_1$ is the energy spent by the gyratory mass of the drive during a single revolution of the press crankshaft;

$E_0 = I\omega_0^2/2$ is the energy accumulated by the gyratory mass of the drive;

I is the flywheel moment of inertia;

$\omega_0$ is the initial angular velocity of the gyratory mass of the drive before commencing the technological operation;

$\epsilon_1 = \omega_1/\omega_0$ is the rate of deceleration of the angular velocity of the gyratory mass (in existing drives $\epsilon_1 = 0.9 - 0.95$);

$\omega_1$ is the final angular velocity of the gyratory mass upon completion of the technological operation.

If the rate of deceleration of the angular velocity would be reduced as compared with the practised rate of deceleration in known drives, then, under the same parameters of the drive the useful energy $E_2$ obtained from it may be determined as follows:

$$E_2 = E_0(1 - \epsilon_2^2)$$

where $\epsilon_2$ is the reduced rate of deceleration of the angular velocity.

The ratio of these energies is expressed like this:

$$\frac{E_2}{E_1} = \frac{1 - \epsilon_2^2}{1 - \epsilon_1^2}$$

Figure 2:
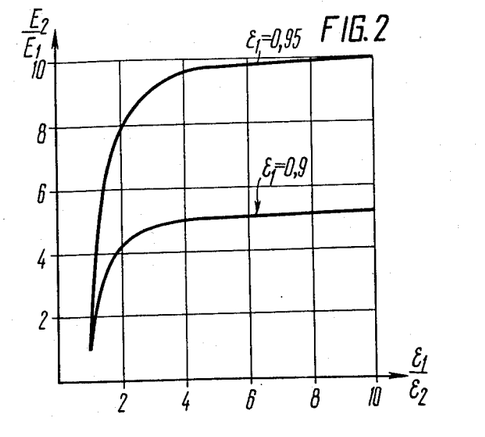
FIG. 2 is a graph characterizing the variation of flywheel kinetic energy versus the rate of deceleration of its angular speed.

The relation of $E_2/E_1$ ratio versus $\epsilon_1/\epsilon_2$ ratio is diagrammed in FIG. 2, wherefrom it follows that as the rate of deceleration of the gyratory mass is reduced two-three-fold the value of the useful energy $E_2$ obtained from the drive is increased as much as 4 – 9 times depending on the initial value of $\epsilon_1$.

This is equivalent to a reduction of the flywheel moment of inertia (with $\omega_0$ = const).

A still more pronounced technical gain can be achieved by an increase of the angular velocity with a simultaneous considerable reduction of the flywheel moment of inertia, i.e. with reduced dimensions of the drive.

Figure 1:
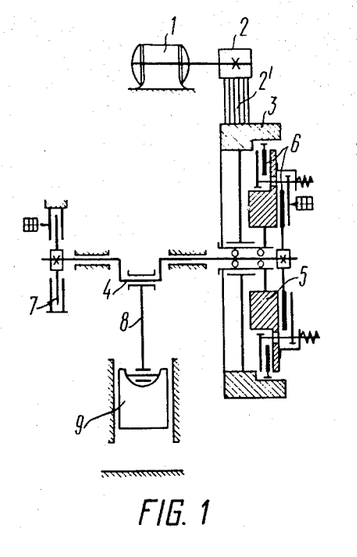
FIG. 1 is a power-flow diagram of the drive with two flywheels.

The gyratory mass (moment of inertia) of the flywheel 5 is determined from the following expression:

$$I_5 = 2 \frac{A_0 + A_1 + A_2}{(1 - \epsilon_1^2)\omega_0^2} - I_4$$

where:

$I_5$ is the moment of inertia (gyratory mass) of the flywheel;

$A_0$ is the work spent for carrying out the technological operation;

$A_1$ is the friction work in converting mechanisms per single revolution of the crankshaft;

$A_2$ is the work spent for elastic deformation of press components;

$\omega_0$ is the initial angular velocity of the drive gyratory mass;

$\epsilon_1$ is the rate of deceleration of the angular velocity of the gyratory mass;

$I_4$ is the gyratory mass of the crankshaft and drive components connected to it.

Dimensions of the flywheel 3 are determined with due account of the permissible slipping of the motor 1, the required output of the press and are dependent on the type and design of the press. Taking into account that available quantity-produced electric motors can operate with slipping not exceeding 20%, the gyratory mass of the flywheel 3, for example used in hot stamping press, comes to be two-three times larger than of the flywheel 5.

Figure 3:
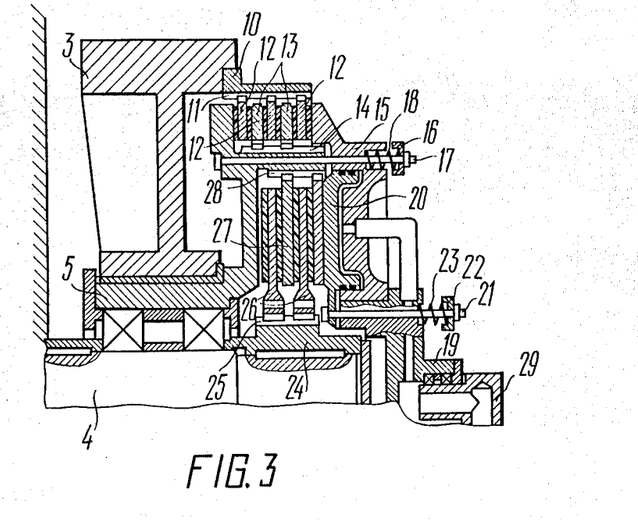
FIG. 3 is an axial sectional view of the clutch.

The other end of the crankshaft 4 mounts a brake 7. The crankshaft 4 by means of a connecting rod 8 is connected to a slide block 9. Instead of the crank and connecting-rod mechanism making up of the crankshaft 4, the connecting rod 8 and slide block 9 in any one of several known mechanisms adapted for converting rotary motion into translatory may be used, such as crank and link, crank and toggle, etc. The clutch 6 is made in the form of a pneumatic friction clutch. FIG. 3 illustrates the design of the clutch 6.

The flywheel 3 is rigidly connected to a splined hub 10 which by means of its splines 11 is connected to driving disks 12 of the clutch 6.

Driven disks 13 of the clutch 6 by means of splines 14 are connected to the flywheel 5. A pneumatic cylinder 15 can be displaced to rest against a ring 16 mounted on bolts 17 securing together the flywheel 5 and the pneumatic cylinder 15. Springs 18 are installed between the ring 16 and the pneumatic cylinder 15. The pneumatic cylinder 15 is secured on a hub 19. A ring-shaped piston 20 of the pneumatic cylinder 15 can move in the axial direction. The piston 20 and the hub 19 are connected by bolts 21 to a washer 22. Placed between the washer 22 and the hub 19 are springs 23 pressing the piston 20 against the hub 19. A splined hub 24 installed on the crankshaft 4 by means of splines 25 is connected to driven disks 26 of the clutch 6. Driving disks 27 of the clutch 6 by means of splines 28 are connected to the flywheel 3. An air delivery head 29 is provided to bring compressed air to the pneumatic cylinder 15.

The drive operates as follows. With the electric motor 1 (FIGS. 1, 3) switched on, its rotation is transmitted to the flywheel 5 through a V-belt drive 2. With the flywheels 3 and 5 rotating idle, the clutch 6 couples them together, the flywheel 5 being isolated from the crankshaft 4. With the clutch 6 in this position the pneumatic cylinder 15 by means of the springs 18 is pressed against the flywheel 5 through the driving disks 12 and driven disks 13. The piston 20 of the pneumatic cylinder 15 by means of the springs 23 is pressed away from the driving disks 27, driven disks 26 and flywheel 5. Before commencement of the working stroke of the slide block 9 compressed air is delivered through the head 29 into the space of the pneumatic cylinder 15.

Under the action of compressed air the piston 20 of the pneumatic cylinder 15 is displaced in the axial direction to press the driving disks 27 and driven disks 26 against the flywheel 5.

Simultaneously, the pneumatic cylinder 15 is moved in the direction opposite to that of the piston 20, and driving disks 12 and driven disks 13 are pressed away from the flywheel 5. The springs 18 and 23 are compressed. The driven disks 26 through the medium of the hub 24 are connected to the crankshaft 4 to couple the flywheel 5 with the crankshaft, and at the same time the flywheels 3 and 5 are disconnected from each other. The slide block 9 in the course of its movement performs the technological operation.

Upon completion of the working stroke of the slide block 9 compressed air is released from the pneumatic cylinder 15. The springs 18 press the pneumatic cylinder 15, driving disks 12 and driven disks 13 against the flywheel 5. Simultaneously, the springs 23 press the piston 20, driving disks 27 and driven disks 26 away from the flywheel 5. The flywheels 5 and 3 are coupled together, while the flywheel 5 is disconnected from the crankshaft 4. The flywheels 3 and 5 are accelerated to accumulate kinetic energy in the course of acceleration. The springs 18 and 23 are selected in such a way that during air delivery into the pneumatic cylinder 15 first the pneumatic cylinder 15 and disks 12 and 13 are pressed away from the flywheel 5, and then the piston 20 and disks 26, 27 are pressed against the flywheel 5, whereas upon releasing air from the pneumatic cylinder 15 first the piston 20 and disks 26, 27 are pressed away from the flywheel 5, and then the pneumatic cylinder 15 and disks 12, 13 are pressed against the flywheel 5. The remaining unspent kinetic energy in the crankshaft 4 and the drive elements rigidly connected to it (such as driven disks 26, driven disks of the brake 7, connecting rod 8, slide block 9, etc.) is damped by means of the brake 7.

In crank presses, the flywheel energy spent in the course of the working stroke of the slide block per single revolution of the crankshaft is consumed by the work of deformation of the blank in performing the technological operation, by the work of friction in the converting mechanism and by the work of elastic deformation of the press components.

Most dangerous for the press is the case of a "rigid impact", i.e. when the work of deformation is equal to zero and the entire energy accumulated by the drive is spent for friction in the converting mechanism and for work of elastic deformation of the press components.

The flywheel energy spent during the working stroke, according to the expression (1) is equal to:

$$E_1 = E_o(1 - \epsilon_1^2)$$

Value $\epsilon_1$ depends on the type of the press. For screw presses $\epsilon_1 = 0$, i.e. $\omega_o = 0$. For crank presses wherein the known drive value $\epsilon_1$ depends on the permissible slipping of the electric motor and with the maximum slipping equal it, for example, to 20%, comes to be $\epsilon_1 = 0.8$.

For crank presses with the herein proposed drive value $\epsilon_1$ is determined by the value of energy required for rotating the crankshaft and displacing the slide block from the extreme lower position to the initial position upon completion of the technological operation. If the value of this energy is equal to 16% of the entire energy accumulated by the flywheel the final speed of the flywheel amounts approximately to 0.4 $\omega_o$, i.e. in this case $\epsilon_1 = 0.4$.

With the above given values of $\epsilon_1$ for screw presses and crank presses incorporating the known and the herein proposed drives the following is obtained:

for screw presses $E_o = E_1$
for crank presses with the known drive $E_o = 2.78\ E_1$
for crank presses with the herein proposed drive $E_o = 1.19\ E_1$ The value of friction work in the screw press is determined by the geometry of the screw pair and by the value of the coefficient of friction and amounts to about 0.15 of the entire kinetic energy in the drive irrespective of the magnitude of force developed on the slide block.

$A_1 = 0.15\ E_1$, where $A_1$ is the work of friction in the converting mechanism.

The value of the work of friction in the converting mechanism of the crank press depends on the geometrical dimensions and the coefficient of friction in the junctions of its elements, and is increased with the increasing force on the slide block, i.e. being variable.

Energy spent for the work of elastic deformation of the machine is determined by the known relation:

$$A_2 = P \cdot S/2$$

where:
P is the force on the slide block;
$S = P/C$ is the value of elastic deformation of the machine elements;
C is the factor of rigidity of the press.

The force developed by the press at the known value of elastic deformation is equal to $$P = \sqrt{2A_2 \cdot C} \qquad (2)$$

Figure 4:
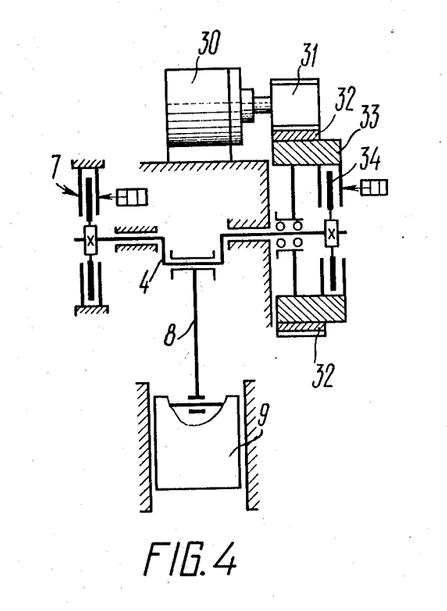
FIG. 4 is a power-flow diagram of the drive with a hydraulic motor.

The other end of the crankshaft 4 mounts a brake 7. The crankshaft 4 by means of a connecting rod 8 is connected to a slide block 9. A flywheel 33 is coupled to the crankshaft 4 by means of a clutch 34. In some designs the clutch 34 may be not installed and in this case the flywheel 33 is rigidly connected to the crankshaft 4.

With a hydraulic motor 30 actuated, its rotation through a gear 31 is transmitted to the flywheel 33. With the flywheel 33 running idle, i.e. before commencement of the working stroke of the slide block 9, the clutch 34 is disengaged to disconnect the flywheel 33 from the crankshaft 4 which during its rotation displaces the slide block 9. During the working stroke of the slide block 9 the flywheel 33 spends kinetic energy accumulated during its acceleration. During this period the speed of the hydraulic motor 30 and the flywheel 33 decreases down to a substantially low value.

At the end of the working stroke of the slide block 9 the clutch 34 disconnects the flywheel 33 from the crankshaft 4, and acceleration of the flywheel 33 is resumed again. Kinetic energy of the crankshaft 4 and the components rigidly connected to it unspent during the working stroke of the slide block 9 are damped by the brake 7.

Figures 5, 6:
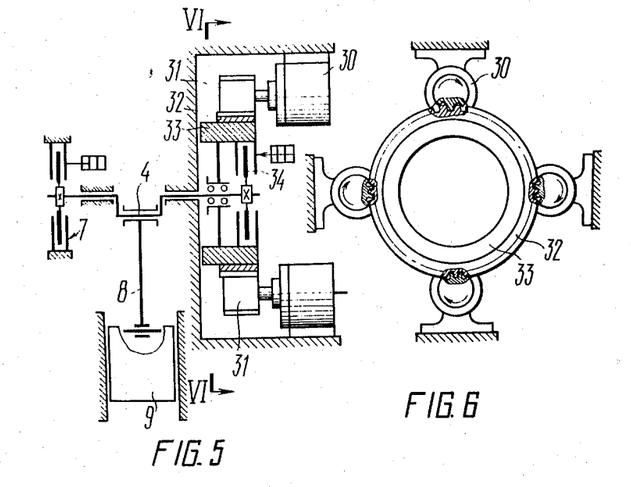
FIG. 5 is a power-flow diagram of the drive with several hydraulic motors.
FIG. 6 is a sectional view taken along the line VI—VI in FIG. 5.

In powerful presses when it is necessary to impart high power to the flywheel the driving source of the machine may incorporate several synchronously operating hydraulic motors 30 (FIGS. 5 – 6) disposed over a circumference concentric with the flywheel 33. Each of the hydraulic motors 30 is geared to ring gear 32 of the flywheel 33 through the medium of a gear 31. Operation of the drive with several hydraulic motors is similar to that of the drive with one hydraulic motor (FIG. 4).

Figure 7:
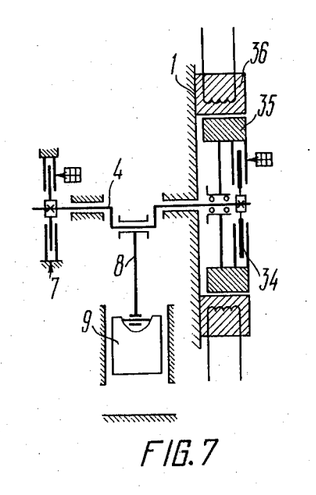
FIG. 7 is a power-flow diagram of the drive with an electric motor having arc stators.
Figure 8:
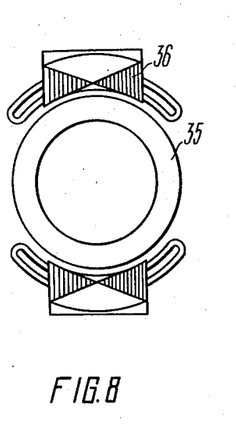
FIG. 8 is a sectional view taken along the line VIII—VIII in FIG. 7.

FIGS. 7 and 8 illustrate a version of the crank press drive design wherein the function of the flywheel is performed by a rotor 35 of electric motor with an arc stator 36.

The rotor 33 has a squirrel-cage winding on its outer surface. The stator 36 embraces the rotor 35 along an arc of circumference shorter than 180°. The length of the arc is selected with a view to obtain the required speed of the rotor 35 and can be calculated by the following formula:

$$n = f \cdot \alpha / p$$

where:
n is the speed of the rotor;
f is the frequency of alternating current;
α is the angle corresponding to the length of arc;
p is the number of pairs of electric motor poles.

The speed of the rotor 35 depends on the type of the press, the force developed by the press, required output, kind of technological operation, etc.

The stator 36 may consist of a number of similar portions disposed symmetrically in relation to the axis of the rotor 35. The design of other elements of the drive is similar to that of the drive version illustrated in FIG. 4. With the winding of the stator 36 energized the magnetic field rotates the rotor 35 and accelerates it. When the clutch 34 is engaged the rotor 35 is connected to the crankshaft 4. In the course of performing the technological operation the speed of the rotor 35 decreases down to a substantially low value as determined by the mode of the technological operation.

Figure 9:
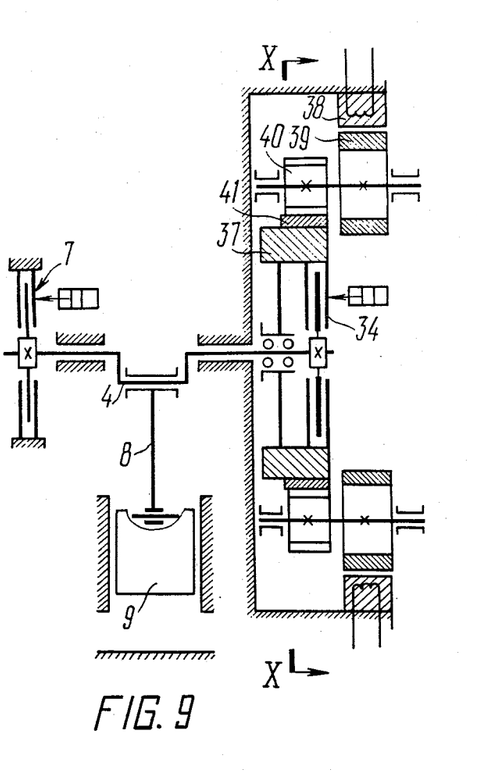
FIG. 9 is a power-flow diagram of the drive with several electric motors having arc stators.
Figure 10:
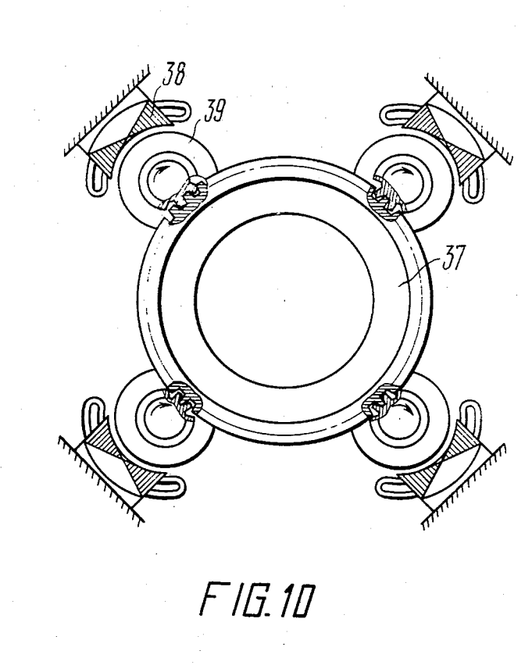
FIG. 10 is a sectional view taken along the line X—X in FIG. 9.

To bring high power to the flywheel the driving source of the press may incorporate several synchronously operating and equal in power electric induction motors (FIGS. 9, 10) disposed over a circumference concentric with a flywheel 37 whose gyratory mass is selected the same as has been described above relevant to other versions of embodiment of the present invention. A stator 38 of each electric motor is disposed on a less than 180° arc of circumference concentric with that of a rotor 39.

The shaft of each rotor 39 of the electric motor mounts a gear 40 which is in mesh with ring gear 41 of the flywheel 37. All the remaining elements of the drive design illustrated in FIGS. 7 – 10 are similar in design to the drive elements illustrated in FIG. 4.

Operation of the drive having several electric motors (FIGS. 9, 10) is similar to that of the drive having one electric motor (as described with reference to FIGS. 7, 8).

Table 1 gives comparative power and force parameters of screw press and crank press with known and proposed drives.

Table 1

| Comparative parameters | Screw press | Crank press with known drive | Crank press with proposed drive |
|---|---|---|---|
| 1 | 2 | 3 | 4 |
| $E_1$, tm | 245 | 245 | 245 |
| p, t | 11,600 | 11,600 | 11,600 |
| $E_o$, tm | 245 | 680 | 291 |
| $A_1$, tm | 38 | 130 | 80 |
| $A_2$, tm | 207 | 550 | 211 |
| $P_{max}$, t | 24,900 | 40,700 | 24,500 |
| $\dfrac{P_{max}}{P_1}$ | 2.17 | 3.5 | 2.15 |

For a known screw press with rated force $P_1 = 11,600$ t, $E_1 = 245$ tm, $A_1 = 38$ tm, and $C = 1,500$ t/mm. Assuming for the crank press, $E_1 = 245$ tm and considering that at loading the press by force $P_1 = 11,600$ t the work of friction is approximately equal to the work of friction spent in the screw press, i.e. $A_1 = 38$ tm, then with a force range of $P = 25,000 - 40,000$ t the work of friction will be correspondingly equal to 80 – 130 tm.

It is seen from Table 1 that loads in the crank press with the proposed drive are 1.5 times less than in the crank press with the known drive.

What we claim is:
1. A crank press drive, comprising: a crankshaft connected by means of a converting mechanism to a working member — a slide block; a flywheel installed on said crankshaft; a motor for operatively rotating said flywheel; a clutch connecting said flywheel to said crankshaft for transmitting torque to the latter to displace said slide block of a press, said flywheel being of such gyrating mass value that kinetic energy accumulated by it is in fact fully spent during one complete revolution of said crankshaft, including consumption of energy needed for performing the technological operation with applying to said slide block maximum load permissible for the given press.

2. A drive as set forth in claim 1, wherein its crankshaft mounts coaxially with said flywheel an additional flywheel of larger diameter and larger gyrating mass as compared with the first one of said flywheels and use is made of a double-position clutch which in one of its positions at idle rotation of the flywheels couples them together, while in its other position during displacement of the slide block it connects the first one of said flywheels to the crankshaft and simultaneously uncouples the flywheels from each other.

3. A drive as set forth in claim 1, wherein the function of the motor is performed by a hydraulic motor connected to the flywheel by means of a gear train.

4. A drive as set forth in claim 1, wherein the function of the motor is performed by several synchronously operating hydraulic motors disposed over a conditional circumference concentric with the flywheel and connected to the latter by means of gear trains of similar gear ratio.

5. A drive as set forth in claim 1, wherein the function of the flywheel is performed by a rotor of electric induction motor whose stator is disposed on an arc of circumference concentric with the flywheel.

6. A drive as set forth in claim 1, wherein the function of the motor is performed by several synchronously operating electric induction motors disposed over a circumference concentric with the flywheel and connected to it by means of gear trains of similar gear ratio, whereas each electric motor has a stator disposed over an arc of circumference concentric with the rotor of the given electric motor.

* * * * *